United States Patent [19]
Maejima et al.

[11] Patent Number: 5,353,230
[45] Date of Patent: Oct. 4, 1994

[54] DATA MANAGING SYSTEM FOR WORK PRODUCTION LINE

[75] Inventors: Yasuhira Maejima; Kenzi Kasuga, both of Nagano, Japan

[73] Assignee: Seiko Epson Corporation, Tokyo, Japan

[21] Appl. No.: 991,540

[22] Filed: Dec. 15, 1992

[30] Foreign Application Priority Data

Jan. 17, 1992 [JP] Japan .................................. 4-26181

[51] Int. Cl.$^5$ ............................................. G06F 15/46
[52] U.S. Cl. .................... 364/468; 235/375; 364/478
[58] Field of Search ............. 364/468, 478, 474.11; 235/375, 376, 383, 385; 483/14, 15; 29/430, 431, 33 P; 198/349, 465.1, 465.2

[56] References Cited

U.S. PATENT DOCUMENTS

| | | | |
|---|---|---|---|
| 4,564,913 | 1/1986 | Yomogida et al. | 364/468 X |
| 4,646,245 | 2/1987 | Prodel et al. | 364/468 |
| 4,821,198 | 4/1989 | Takeuchi et al. | 364/468 |
| 4,831,540 | 5/1989 | Hesser | 364/468 |
| 4,942,534 | 7/1990 | Yokoyama et al. | 364/468 |
| 5,166,884 | 11/1992 | Maney et al. | 364/468 |

FOREIGN PATENT DOCUMENTS

| | | |
|---|---|---|
| 0141070 | 8/1984 | European Pat. Off. . |
| 0229423 | 7/1987 | European Pat. Off. . |
| 4113556 | 10/1991 | Fed. Rep. of Germany . |
| 60-016348 | 11/1985 | Japan . |
| 1199755 | 11/1989 | Japan . |

*Primary Examiner*—Joseph Ruggiero
*Attorney, Agent, or Firm*—Sughrue, Mion, Zinn, Macpeak & Seas

[57] ABSTRACT

A data managing system for a production line in which a plurality of separated assembly lines are connected together by a conveying pallet. Both the assembly pallet and conveying pallet are provided with a data storage member, the inspection result at each inspection station is stored in the data storage member attached to the assembly pallet, and the data stored in the data storage member attached to the assembly pallet is transferred to the storage member provided at the conveying pallet at a workpiece removing station.

10 Claims, 5 Drawing Sheets

DATA MANAGING SYSTEM FOR WORK PRODUCTION LINE

BACKGROUND OF THE INVENTION

The present invention relates to a data managing system for a work production line for supplying and receiving processing data between a memory disposed on a conveying pallet and a processing station disposed on a conveying passage of the palette.

Conventionally, during manufacturing mechanical apparatus constituted by assembling a plurality of parts, as disclosed in Unexamined Japanese Patent Application (OPI) No. Sho. 60-16348, in a case of conveying a workpiece mounted on a palette along a production line and a plurality of parts are assembled onto the workpiece at the various processing variations a memory member such as an IC card or the like is disposed on the palette, which memory stores therein processing conditions or inspection data, thereby to provide data corresponding to the specific workpiece.

However, in a case where a plurality of separate lines are required, for example, if the production line cannot be constructed continuously in a single line due to a small installation space, if the cycle time is different between assembly lines or if a workpiece is conveyed from an assembly line for individual units to a main assembly line for the overall products, the palette must be conveyed to the next line while the workpiece is mounted thereon. For this reason, it is often difficult to convey such a palette, particularly when the production line is for set up producing a small scale product such as a recording head of a printing apparatus.

The above problem may be solved by providing connections between the assembly lines by a transmission line to transmit data for each workpiece. However, this will cause another difficulty in that the workpiece must be identified with specific data.

SUMMARY OF THE INVENTION

The present invention was made in view of the foregoing difficulties and problems accompanying the conventional data managing system for production lines.

Accordingly, an object of the present invention is to provide a data managing system for a production line in which a plurality of separated assembly lines are connected together by a conveying pallet. Each of the assembly lines includes a parts supplying station, a process station, an inspection station and a workpiece removing station, which are provided along a passage for conveying assembly pallets. First and second data storage members are disposed on each of the assembly pallets and the conveying pallets, an inspection result is stored in the first data storage member at each of the inspection stations, whereas the data stored in the first data storage member is transferred to the second data storage member at the workpiece removing station, and the data stored in the second data storage member is transferred at the next parts supplying station to a first data storage member of the assembly palette, corresponding to each of the workpieces.

According to the present invention, a plurality of the inspection data obtained in one assembly line are transferred to the second data storage member, and then the data is transferred to the first data storage member of the assembly palette in the next assembly line, corresponding to the specific workpiece. Therefore, according to the present invention, even if the plurality of assembly lines are separated from one another or located far from one another, the inspection data of each workpiece by each assembly line can accurately be maintained. The reliability of managing the quality of workpieces can be maintained effectively.

DESCRIPTION OF THE PREFERRED EMBODIMENTS

The preferred embodiment of the present invention will now be described in detail with reference to the accompanying drawings.

Figure 1:
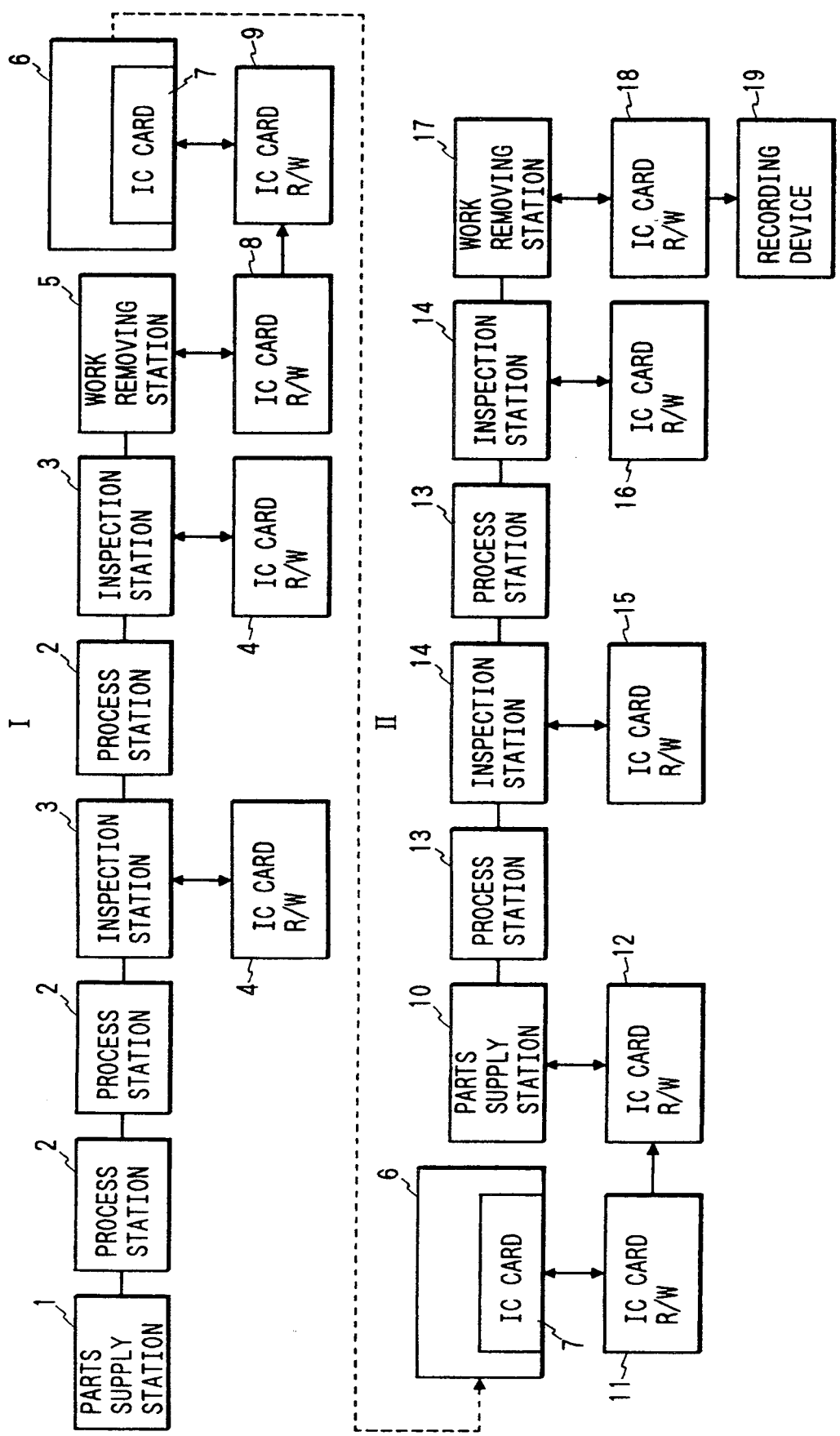
FIG. 1 is a block diagram showing one embodiment of an assembly line to which the present invention is applied.

FIG. 1 is a block diagram showing one embodiment of an assembly line to which the present invention is applied. A parts supplying station 1 where a workpiece conveyed from the outside is mounted on an assembly palette 40 is disposed at an initial stage of a first assembly line I. The assembly line I includes, along the conveying passage of the assembly palette 40, process stations 2, 2 where the workpieces mounted on the assembly palette 40 are processed, and inspection stations 3, 3 where processed dimensions and processed accuracy are measured and which are disposed immediately after the process station 2. Each of the inspection stations 3, 3 is provided with an IC card reading and writing member 4, so that inspection results of every processed part are recorded in an IC card mounted on the assembly palette 40.

A workpiece removing station 5 is located at an end of the assembly line I where, after the workpiece is subjected to required processes, the workpiece is removed from the assembly pallet 40 and mounted on a conveying pallet 6 on which are mounted a plurality of workpieces. The conveying pallet 6 is provided with a storage member such as an IC card 7, for example, having a capacity for storing the inspection data of a plurality of workpieces. IC card reading and writing members 8 and 9 are disposed at the workpiece removing station 5 and a position of waiting for the conveying pallet, respectively, so that the inspection data is read out by the IC card reading and writing member 8 from the IC card mounted on the assembly pallet 40 simultaneously with the removal of the workpiece which is provisionally assembled from the assembly pallet 40 at the workpiece removing station 5. At the same time, the data is recorded on the IC card 7 mounted on the conveying pallet 6 by the IC card reading and writing member 9.

A second assembly line II, which is separately constructed from the first assembly line I, includes at an initial stage thereof a head parts supplying station 10 where the workpiece which is provisionally assembled by the first assembly line I and conveyed therefrom upon the conveying pallet 6 is mounted on an assembly pallet 40 which is the same as that used in the first assembly line I.

IC card reading and writing members 11 and 12 are disposed at a position of waiting for the conveying pallet 6 and the head parts supplying station 10, respectively, so that the data of each workpiece recorded on the IC card in the assembly line I is read out by the IC card reading and writing member 11 and transferred to the IC card reading and writing member 12 and then recorded on the IC card 7 of the assembly pallet 40 every time the provisionally assembled workpiece is taken off the conveying pallet 6.

Similar to the first assembly line I, the second assembly line II includes, along the conveying passage of the assembly palette 40, process stations 13, 13 where the workpieces mounted on the assembly palettes 40 are processed and inspection stations 14, 14 where processed dimensions and processed accuracy are measured and which are disposed immediately after the process station 2. Each of the inspection stations 14 is provided with an IC card reading and writing member 15 and 16, with which inspection results of all processed parts are recorded in an IC card mounted on the assembly palette 40. A head removing station 17 is located at an end of the assembly line II where the workpiece is removed from the assembly pallet 40. The head parts removing station 17 is provided with an IC card reading and writing member 18 for reading out process data of the recording head (work) recorded on the IC card 43 of the assembly pallet 40 and then transferred to a recording device 19.

Figure 2:
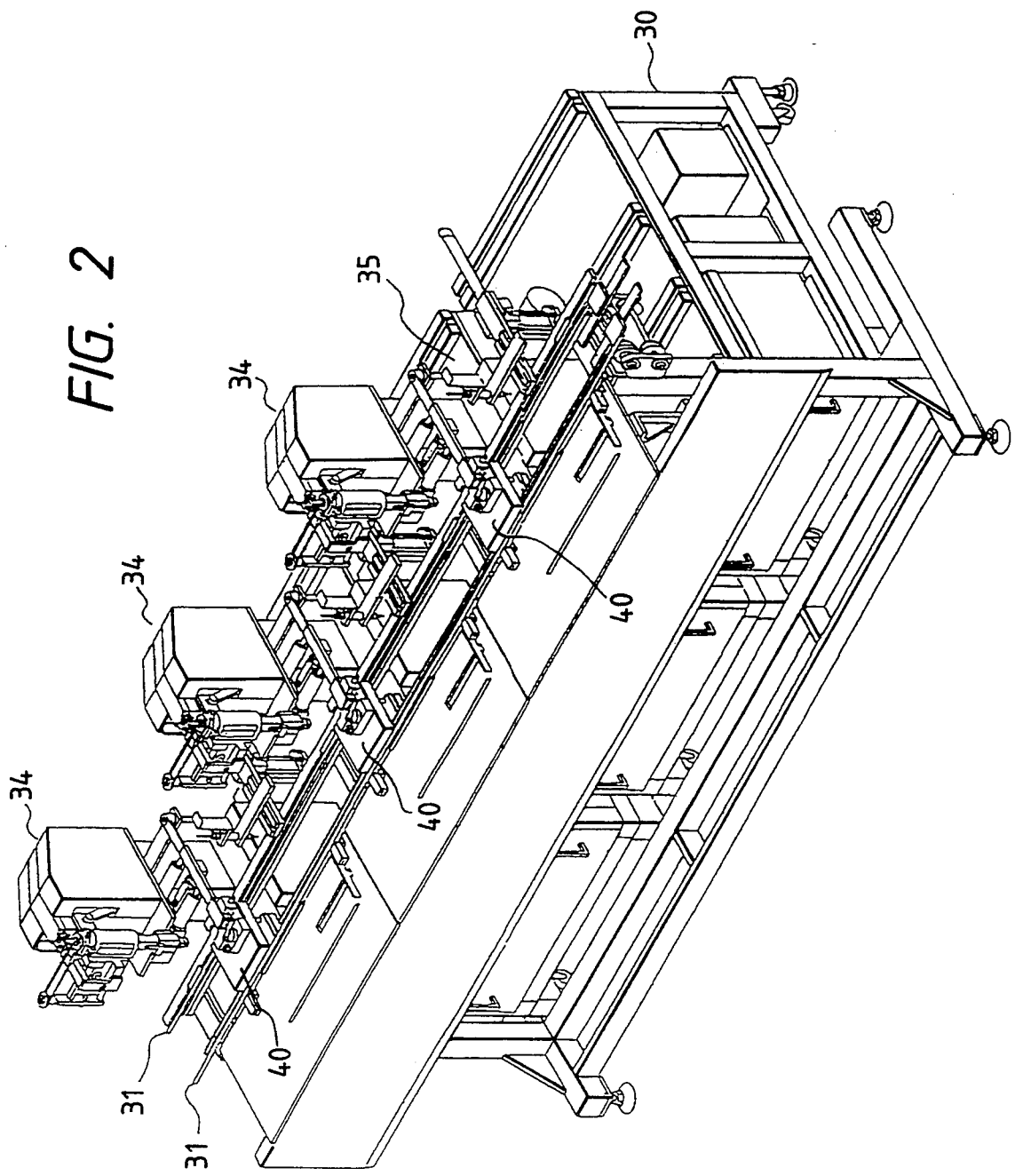
FIG. 2 is a perspective view showing the process station, and inspection station which constitute the assembly line according to one embodiment of the present invention.

FIG. 2 is a perspective view showing the process station and inspection station, which constitute the assembly line according to one embodiment of the present invention.

The assembly pallets 40 move on a pair of conveying rails 31, 31 fixedly secured on an upper surface of a base frame 30. Process stations 34 and an inspection station 35 are provided at desired locations as a unit. The unitary structure enhances the flexibility of the production line architecture.

Figure 3A:
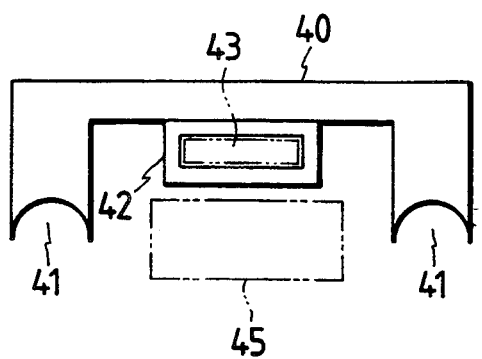
FIGS. 3A and 3B show an embodiment of the assembly pallet.
Figure 3B:
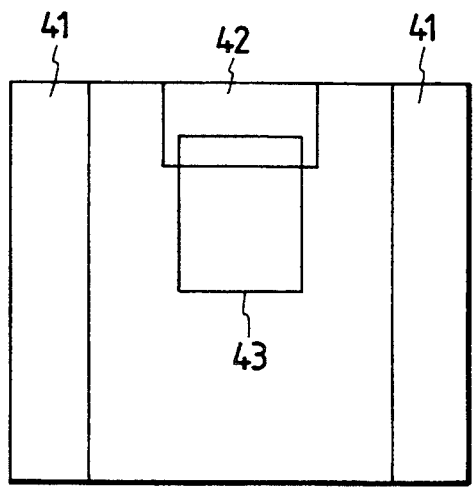

FIGS. 3A and 3B show an embodiment of the assembly pallet. The assembly pallet is provided with a pallet body 40, a pair of guide grooves 41 at a lower surface of the side wall thereof which are parallel with the assembly line for engaging with the pair of conveying rails 31, and a socket 42 at the bottom of the body 40 for inserting therein the IC card 43. Reference numeral 45 denotes a head for connecting the pallet to an IC card reading and writing member.

Figure 4:
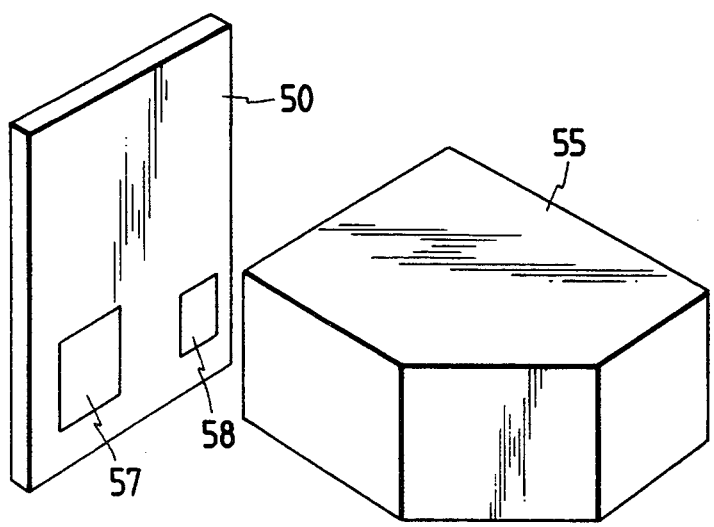
FIG. 4 is a schematic diagram showing an embodiment of an IC card applicable for the present invention.

FIG. 4 is a schematic diagram showing an embodiment of an IC card applicable for the present invention. A plate-like IC card 50 has a semiconductor storage circuit and reading and writing control circuit, which are encapsulated with a high-molecular material. The IC card is further provided at a surface thereof with a pair of coils 57 and 58 for transmission of power and signals in a non-contacting manner. The coils 57 and 58 are supplied with operational power from an alternate magnetic field from a recording head 55 when the coils are located at a position facing the recording head. Further, data is transferred between the coils and recording head by a high frequency signal acting as a carrier signal, so that the data from the inspection station is stored in and read from the semiconductor storage circuit.

Figure 5:
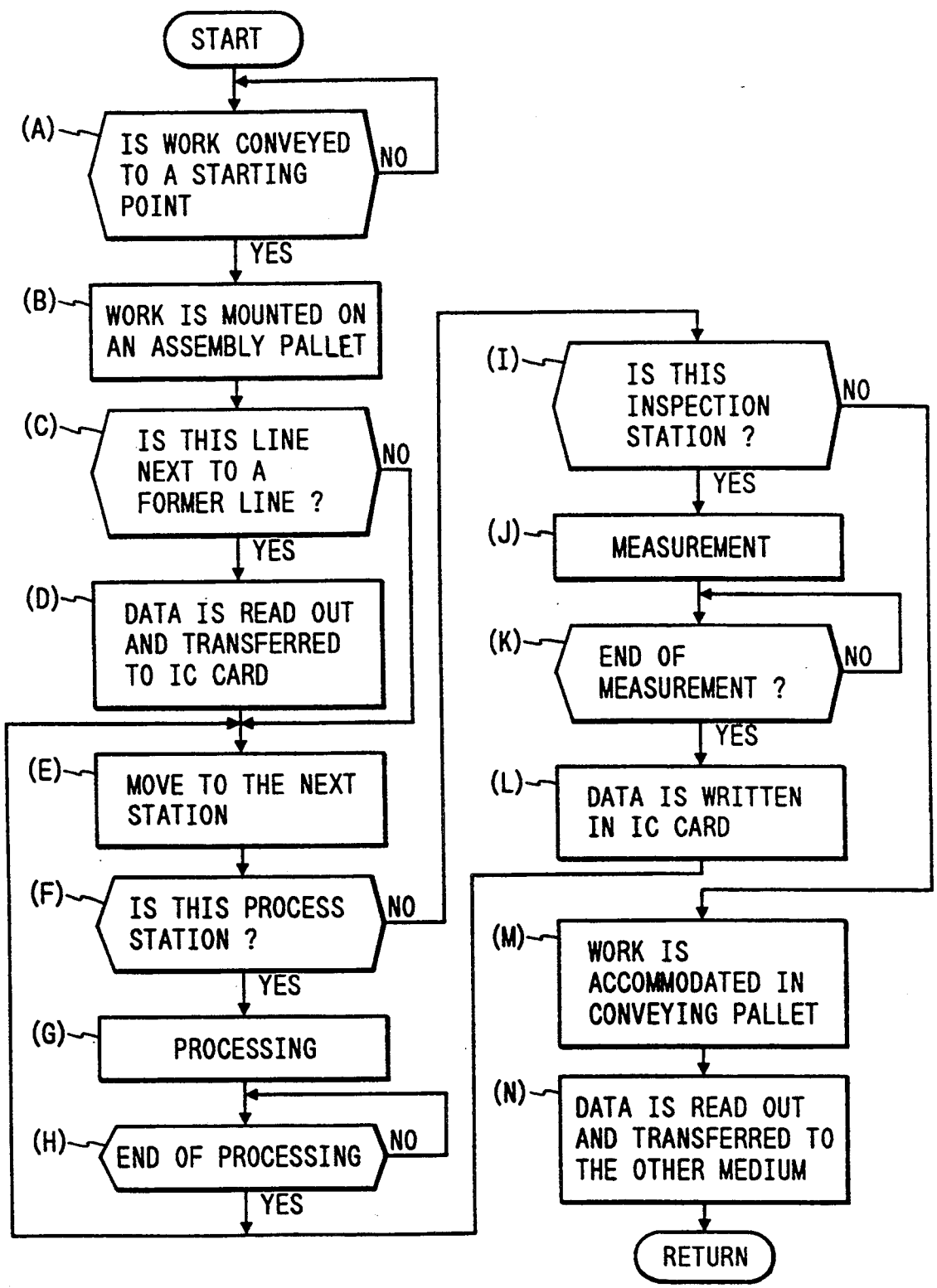
FIG. 5 is a flowchart showing an operation of the system according to the present invention.

The operation of the system thus constructed will be described with reference to a flowchart shown in FIG. 5.

When a preassembled workpiece is conveyed by a parts conveying pallet (not shown) to a starting point of the production line (Step A), the workpiece is mounted on the assembly pallet 40 by the head supply station 1 (Step B). The assembly pallet 40 is conveyed by a belt-conveyer or the like to the process stations 2 (Step E), necessary parts are assembled onto the workpiece (Steps F, G) and, after the assembling process (Step H), the pallet 40 is conveyed to the next process station 2 (Step E).

Figure 6:
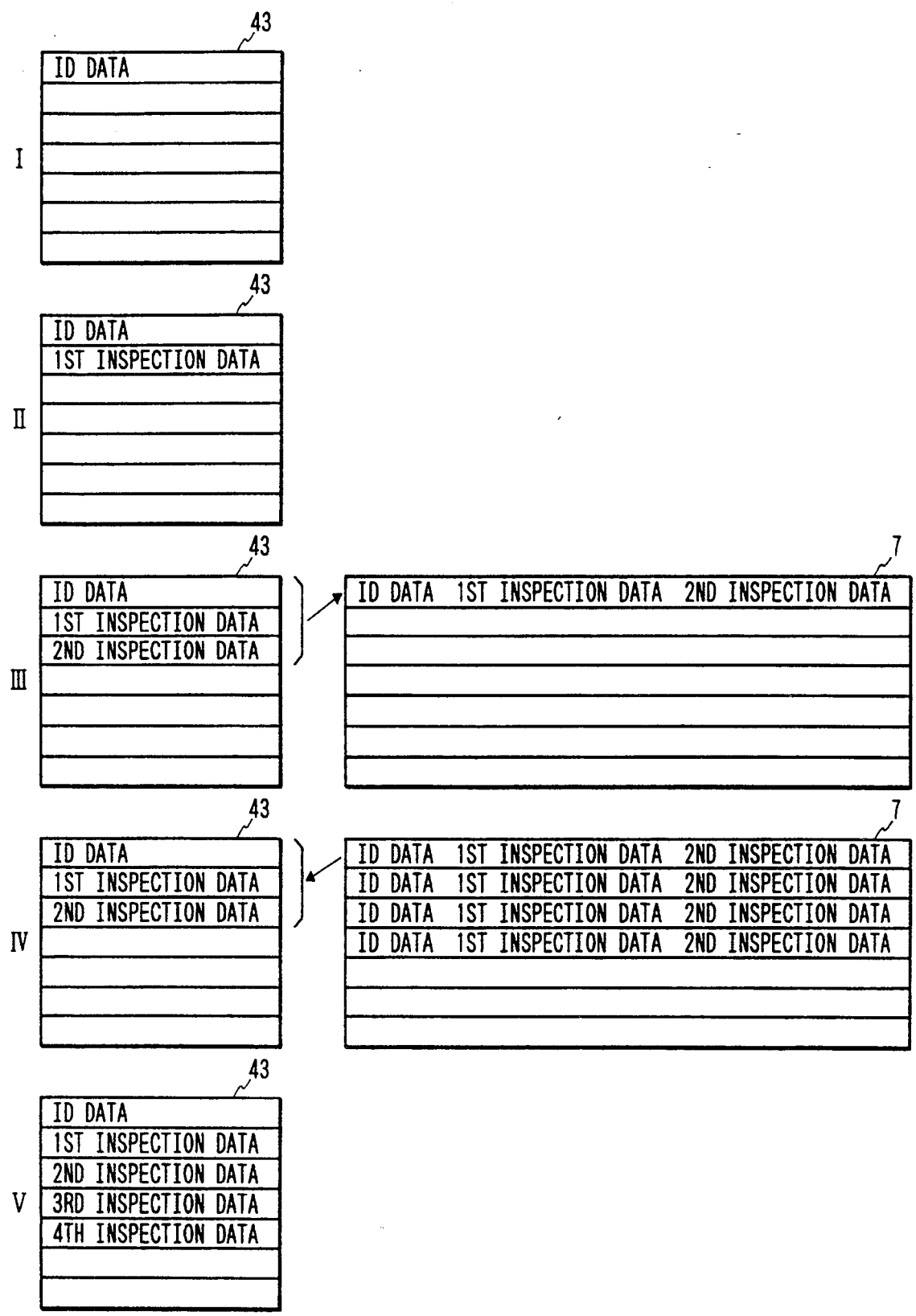
FIG. 6 shows a condition of storage in an IC card.

The assembly is thus completed with required process steps. The pallet 40 is then moved to the inspection station 3 (Step I) where the size or relative position of the parts assembled on the workpiece during the assembling processes are measured (Step J). After finishing the measurement (Step K), the data representing the result of the measurement is output by the IC card reading and writing member 4 to the recording head and written in the IC card 43 attached to the assembly pallet 40 with ID data (FIG. 6, I,II and Step L), After the inspection, the workpiece assembled with required parts is transferred to the workpiece removing station 5, which is an end station of the production, where the workpiece mounted on the assembly pallet 40 is removed therefrom by an arm of an industrial robot or the like and then accommodated on the conveying pallet 6 (Step M). At the same time, the measurement data stored in the IC card 43 attached to the assembly pallet 41 from which the workpiece is removed is read by the IC card reading and writing member 8 provided at the workpiece removing station 5, and the data is transferred to the IC card reading and writing member 9 provided at the conveying pallet 6 through a transmission line and then written in the IC card 7 attached to the conveying pallet 6 (FIG. 6, III and Step N).

The workpiece preassembled as described above is accommodated on the conveying pallet 6, which conveys the workpiece to a start point of the second assembly line II (Step A). At the start point of the second assembly line II, each preassembled workpiece is taken off the conveying pallet 6 in a predetermined sequence by the head parts supplying station 10 and then mounted on the assembly pallet 40, which is similar to that employed in the first assembly line (Step B). In this case, since the second line is subsequent to the first assembly line (Step C), the measurement data stored during the former inspection in the storage member (IC card) 7 is read out by the IC card reading and writing member 11 and transferred through the transmission line to an IC card reading and writing member 12. The measurement data thus transferred is then written in the IC card 43 of the assembly pallet 40 mounting thereon the preassembled workpiece (FIG. 6, V and Step D).

After carrying out a predetermined provisional process, the assembly pallet 40 is conveyed to the process station 13 where necessary parts are assembled on the preassembled workpiece (Steps F, G and H), similar to the first assembly line I. Afterwards, the second inspection is carried out in necessary steps by inspection stations 14 (Steps I, J and K). The result of the inspection (measurement) is written in the IC card 43 attached to the assembly pallet 40 by the IC card reading and writing member 15 (FIG. 6, V and Step L).

When the assembly pallet 40 is conveyed to the end of the assembly line after completing the predetermined process steps, the completely assembled workpiece is removed from the assembly pallet 40 at the removing station 17. At the same time, all inspection data is read out by the IC card reading and writing member 43 provided at the assembly pallet 40 and stored in the recording device 19.

Although the above embodiment relates to the case of employing separate two assembly lines, the invention is not limited thereto or thereby. For example, it is apparent that the concept of the present invention may be applied to a product line having three separate assembly lines.

As described above, according to the present invention, both the assembly pallet and conveying pallet are provided with a data storage member, the inspection result at each inspection station is stored in the data storage member attached to the assembly pallet, and the data stored in the data storage member attached to the assembly pallet is transferred into the storage member provided at the conveying pallet at the workpiece removing station. Therefore, the inspection data for a specific workpiece which must be assembled through a plurality of separated assembly lines can be managed corresponding to the workpiece. Owing to this data managing system, even if one product line is divided into a plurality of assembly lines which are located far from one other, the reliability of managing the quality of workpieces can be maintained effectively.

What is claimed is:

1. A data managing system for a workpiece production line comprising a plurality of assembly lines connecting sequentially to the next line, each assembly line comprising:

an assembly pallet for mounting thereon a workpiece, said assembly pallet comprising a data storage means;

a parts supplying station where a workpiece conveyed from outside is mounted on said assembly pallet;

at least one process station where the workpiece mounted on said assembly pallet is processed;

at least one inspection station where the processed workpiece is measured, said inspection station comprising means for reading and writing data of a measurement in said data storage means of said assembly pallet;

a workpiece removing station where the workpiece is removed from said assembly pallet and mounted on a conveying pallet for conveying the workpiece to the next assembly line, said conveying pallet comprising data storage means, said workpiece removing station comprising means for transferring said measurement data stored in said data storage means of said assembly pallet to said data storage means of said conveying pallet.

2. The data managing system of claim 1, further comprising a data recording device at an end of the last assembly line for recording therein all data of the workpiece.

3. The data managing system of claim 1, wherein said data storage means of said assembly pallet comprises an IC card.

4. The data managing system of claim 1, wherein said data storage means of said conveying pallet comprises an IC card.

5. The data managing system of claim 3, wherein said assembly pallet comprises:

a pallet body;

a pair of guide grooves disposed at a lower surface of a side wall thereof which are parallel with the assembly line for engaging with a pair of conveying rails; and a socket disposed at a bottom of said body for inserting therein said IC card.

6. The data managing system of claim 3 or 4, wherein said IC card is a plate-like card, said IC card comprising:

a semiconductor storage circuit and reading and writing control circuit which are encapsulated with a high-molecular material;

a pair of coils for a transmission of power and signal in a non-contacting member, said coils being supplied with operational power from an alternating magnetic field from a recording head of said data reading and writing means when said coils are located at a position facing said recording head, thereby transferring said data between said coils and said recording head by a high frequency signal acting as a carrier signal.

7. A method for managing data for a work production line comprising a plurality of assembly lines connected sequentially to the next line, comprising steps of:

mounting at least one workpiece on an assembly pallet having a data storage member;

processing the workpiece mounted on said assembly pallet;

inspecting the processed workpiece;

writing data of the result of said inspection in said data storage member of said assembly pallet;

removing the workpiece from said assembly pallet and mounting the same workpiece on a conveying pallet having a data storage member for conveying the workpiece to the next assembly line while transferring the data stored in said data storage member of said assembly pallet to said data storage member of said conveying pallet;

transferring data stored in said data storage member of said conveying pallet to a storage member of a new assembly pallet in the second assembly line.

8. The data managing method of claim 7, further comprising a step of recording all data of the workpiece in a data recording device at an end of the last assembly line.

9. The data managing method of claim 7, wherein said data storage member of said assembly pallet and said conveying pallet comprises an IC card.

10. The data managing method of claim 7, wherein said IC card is a plate-like card, said IC card comprising:

a semiconductor storage circuit and a reading and writing control circuit which are encapsulated with a high-molecular material;

a pair of coils for a transmission of power and by signals in a non-contacting manner, said coils being supplied with operational power from an alternate magnetic field from a recording head of said data reading and writing means when said coils are located at a position facing said recording head, thereby transferring said data between said coils and said recording head by a high frequency signal acting as a carrier signal.

* * * * *